United States Patent
Suh

(10) Patent No.: US 8,746,418 B2
(45) Date of Patent: Jun. 10, 2014

(54) DISC BRAKE

(75) Inventor: Byung Guk Suh, Incheon (KR)

(73) Assignee: Mando Corporation, Gyeonggi-Do (KR)

( * ) Notice: Subject to any disclaimer, the term of this patent is extended or adjusted under 35 U.S.C. 154(b) by 449 days.

(21) Appl. No.: 12/956,807

(22) Filed: Nov. 30, 2010

(65) Prior Publication Data

US 2011/0127122 A1 Jun. 2, 2011

(30) Foreign Application Priority Data

Nov. 30, 2009 (KR) .................. 10-2009-0116773

(51) Int. Cl.
*F16D 65/00* (2006.01)

(52) U.S. Cl.
USPC ..................... 188/73.1; 188/250 B

(58) Field of Classification Search
USPC .............. 188/71.1, 73.1, 73.31, 73.35–73.38, 188/73.43, 73.45, 73.46
See application file for complete search history.

(56) References Cited

U.S. PATENT DOCUMENTS

| | | | | |
|---|---|---|---|---|
| 3,677,372 A | * | 7/1972 | Burnett ....................... | 188/73.45 |
| 5,025,897 A | * | 6/1991 | Hirashita et al. ........... | 188/73.38 |
| 6,527,090 B1 | * | 3/2003 | Barillot et al. ............. | 188/73.38 |
| 6,533,080 B2 | * | 3/2003 | Miyata ...................... | 188/73.37 |
| 7,837,015 B2 | * | 11/2010 | Klement et al. ........... | 188/73.38 |
| 2005/0241893 A1 | * | 11/2005 | Goodreid .................... | 188/73.1 |
| 2007/0205061 A1 | * | 9/2007 | Yagi ............................ | 188/73.38 |
| 2007/0240946 A1 | * | 10/2007 | Schorn et al. ............... | 188/73.38 |
| 2008/0017458 A1 | * | 1/2008 | Aydt et al. ................... | 188/73.1 |
| 2008/0190715 A1 | * | 8/2008 | Kang ........................... | 188/73.1 |
| 2009/0283372 A1 | * | 11/2009 | Matsushima .............. | 188/73.37 |
| 2010/0065385 A1 | * | 3/2010 | Teper et al. ................. | 188/73.45 |
| 2011/0073418 A1 | * | 3/2011 | Kim ........................... | 188/73.43 |

FOREIGN PATENT DOCUMENTS

| | | |
|---|---|---|
| JP | 2008-157267 A | 7/2008 |
| KR | 10-2009-0077183 A | 7/2009 |

OTHER PUBLICATIONS

Korean Office Action issued in Korean Patent Application No. KR 10-2009-0116773 dated Mar. 6, 2013.

* cited by examiner

*Primary Examiner* — Robert A Siconolfi
*Assistant Examiner* — Charles Poon
(74) *Attorney, Agent, or Firm* — McDermott Will & Emery LLP

(57) ABSTRACT

Disclosed is a disc brake. The disc brake includes clip parts provided at inner portions of both side ends of a pair of pad plates and engaged with protrusions formed in the carrier and torsion pins fitted into the clip parts such that the clip parts are rotated between the pad plates upon a braking operation of the disc brake. Upon the braking operation, the pad plates push the carrier so that the clip parts are rotated about the torsion pins by the pad plates. Thus, strain energy of the carrier is absorbed through warpage deformation of the torsion pins, so that the carrier has sufficient strength even if an outer beam is removed.

4 Claims, 3 Drawing Sheets

DISC BRAKE

This application claims the benefit of Korean Patent Application No. 10-2009-0116773 filed on Nov. 30, 2009, in the Korean Intellectual Property Office, the disclosure of which is incorporated herein by reference.

BACKGROUND

1. Field

The disclosure relates to a disc brake. More particularly, the disclosure relates to a disc brake capable of improving the structure of a carrier and a caliper housing.

2. Description of the Related Art

In general, a disc brake is installed in a vehicle to decelerate or stop a vehicle or to keep the vehicle in a stop state. The disk brake generates braking force by pressing pads against both sides of a disc rotating together with the disc.

Such a disc brake includes a caliper housing in which a piston is accommodated to move back and forth according to braking pressure, a carrier fixed to a vehicle body, in which a pair of pad plates including pads are installed in the carrier, and a disc rotating together with a wheel in a state in which an outer circumferential surface of the disc is partially inserted between the pad plates.

The carrier is fixed to a knuckle of the vehicle body by a bolt and the pad plates are slidably installed in the carrier. In addition, the carrier supports the torque generated upon the braking operation, so the carrier is urged in the rotational direction of the disc. Thus, a beam may be provided to support the carrier such that carrier may not be deformed.

In order to ensure a gap between the wheel and the caliper housing, an outer beam provided at an outer portion of the carrier may be omitted. In this case, however, the strength of the carrier may be lowered due to the omission of the outer beam.

SUMMARY

Accordingly, it is an aspect of the disclosure to provide a disc brake, capable of maintaining strength of a carrier even if an outer beam formed at an outer portion of the carrier is removed.

Additional aspects and/or advantages of the disclosure will be set forth in part in the description which follows and, in part, will be apparent from the description, or may be learned by practice of the disclosure.

The foregoing and/or other aspects of the disclosure are achieved by providing a disc brake including a disc rotating together with a wheel of a vehicle, inner and outer pad plates provided on inner surfaces thereof with pads to press the disc, a carrier in which the pad plates are installed such that the pad plates move back and forth in the carrier, and a caliper housing in which a piston coupled to the carrier to press the inner pad plate against the disc is installed, wherein clip parts are connected to the carrier at inner portions of both side ends of the pad plates and torsion pins are fitted into the clip parts such that the clip parts are rotated between the pad plates upon a braking operation of the disc brake.

According to the disclosure, the disc brake further includes protrusions provided at both side ends of the carrier while protruding upward from tips of the both side ends of the carrier, wherein the both side ends of the carrier protrude forward and extend inward in opposition to each other.

According to the disclosure, the protrusions engage with the clip parts.

According to the disclosure, the outer pad plate is formed with insertion holes into which the torsion pins are inserted.

As described above, according to the disc brake of the disclosure, the pad plates push the carrier upon the braking operation, so that the clip parts are rotated about the torsion pins by the pad plates. Thus, strain energy of the carrier is absorbed through warpage deformation of the torsion pins, so that the carrier has sufficient strength even if the outer beam is removed.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
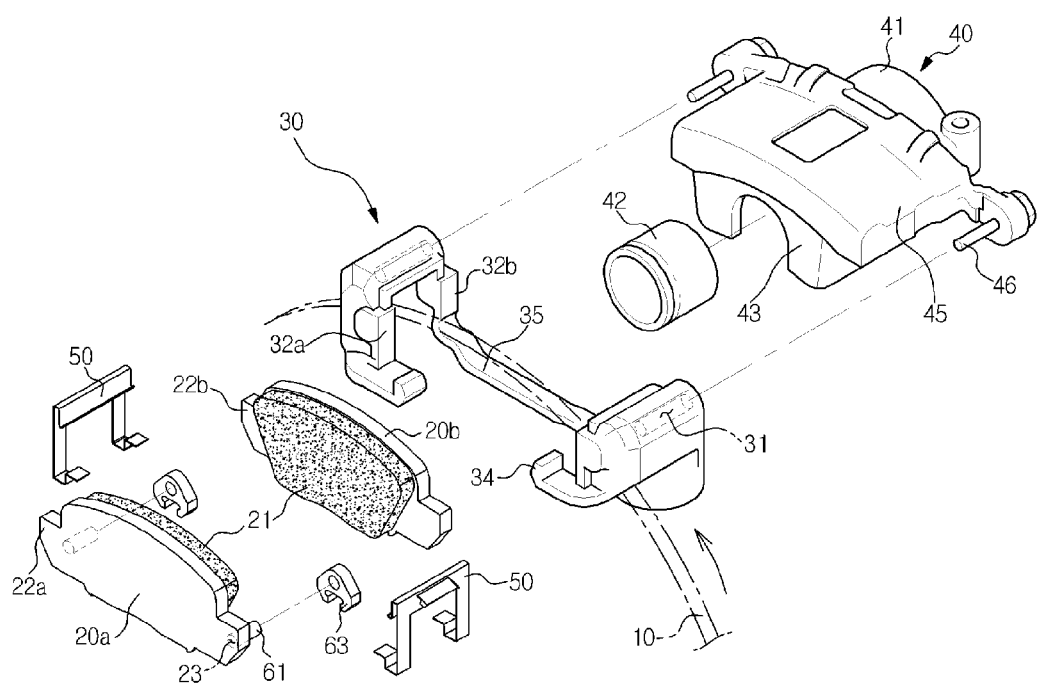
FIG. 1 is an exploded perspective view showing a disc brake for a vehicle according to the disclosure.
Figure 2:
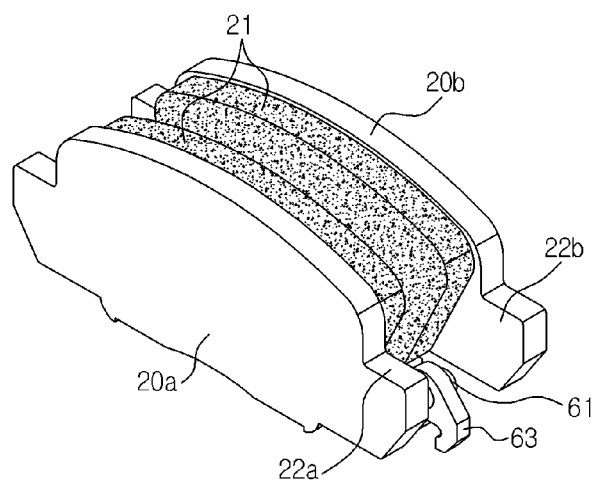
FIG. 2 is a perspective view showing an assembling state of a caliper housing and a carrier illustrated in FIG. 1.

Reference will now be made in detail to the embodiments of the disclosure, examples of which are illustrated in the accompanying drawings, wherein like reference numerals refer to the like elements. The embodiments are described below to explain the disclosure by referring to the figures.

As shown in FIG. 1, the disc brake includes a caliper housing 40 in which a piston 42 is accommodated to move back and forth according to braking pressure, a carrier 30, in which a pair of pad plates 20a and 20b including pads 21 are installed while being spaced apart from each other at a predetermined interval, and a disc 10 rotating together with a wheel (not shown) in a state in which an outer circumferential surface of the disc 10 is partially inserted between the pad plates 20a and 20b.

In more detail, the caliper housing 40 includes a cylinder part 41 provided therein with the piston 42, a finger part 43 for operating the outer pad plate 20a, and a connection part 45 for connecting the finger part 43 to the cylinder part 41.

As mentioned above, the piston 42 is accommodated in the cylinder part 41 in such a manner that the piston 42 moves back and forth by braking oil supplied from a master cylinder (not shown) to press the inner pad plate 20b against the disc 10. An elastic sealing member (not shown) may be installed at an inner circumferential portion of the cylinder part 41 to return the piston 42 to its initial position.

The finger part 43 protrudes downward from one side of the caliper housing 40 to support a rear surface of the outer pad plate 20a.

As described above, the connection part 45 connects the cylinder part 41 to the finger part 43.

In addition, guide rods 46 are provided at both side ends of the caliper housing 40 to allow the caliper housing 40 to slidably couple with the carrier 30. The guide rods 46 are inserted into guide holes 31 of the carrier 30, which are positioned corresponding to the guide rods 46.

The carrier 30 is securely mounted on a knuckle (not shown) of a vehicle body by a mounting bolt (not shown). The carrier 30 supports the pad plates 20a and 20b such that the pad plates 20a and 20b can be prevented from being separated from their positions.

The guide holes 31 are formed through both side ends of the carrier 30 such that the guide rods 46 can be inserted into the guide holes 31.

In addition, guide parts 32a and 32b are formed at an inner portion of the carrier 30 to install the pad plates 20a and 20b, and the pad plates 20a and 20b are formed with installation grooves 22a and 22b which are recessed inward to couple with the guide parts 32a and 32b of the carrier 30.

The pad plates 20a and 20b include the inner pad plate 20b having an inner surface to which the pad 21 is attached and an outer surface making contact with a front end of the piston 42, and the outer pad plate 20a having in inner surface to which the pad 21 is attached and an outer surface making contact with the finger part 43.

In addition, pad springs 50 are installed between the carrier 30 and the pad plates 20a and 20b to facilitate the movement of the pad plates 20a and 20b while preventing the pad plates 20a and 20b from being vibrated when the vehicle is vibrated.

The carrier 30 is provided with a main beam 35, which allows the carrier 30 to endure the torque applied from the disc 10 upon the braking operation of the disc brake and fixes the carrier 30 to the vehicle body.

According to the embodiment of the disclosure, different from the related art in which an outer beam is provided at an outer portion of the carrier 30 in addition to the main beam 35 to allow the carrier 30 to endure the torque applied from the disc 10 upon the braking operation of the disc brake, the carrier 30 may have sufficient strength even if the outer beam is removed.

To this end, as shown in FIG. 1, both side ends of the carrier 30 protrude forward and extend inward in opposition to each other. In addition, protrusions 34 are provided at both side ends of the carrier 30 while protruding upward from tips of the both side ends of the carrier.

In addition, clip parts 63 and torsion pins 61 are provided at inner portions of both side ends of the pad plates 20a and 20b. The clip parts 63 engage with the protrusions 34 of the carrier 30 to enable the pad plates 20a and 20b to slidably move. The torsion pins 61 rotate the clip parts 63 as the pad plates 20a and 20b push the carrier 30 upon the braking operation.

The clip parts 63 are located at the inner surface of the outer plate 20a to perform the function of the outer beam which has been removed. In addition, as mentioned above, the clip parts 63 are formed with grooves to engage with the protrusions 34 of the carrier 30.

The torsion pins 61 may rotatably support the clip parts 63 between the pad plates 20a and 20b. The torsion pins 61 are inserted into insertion holes 23 formed at both side ends of the inner surface of the outer pad plate 20a and located between the pad plates 20a and 20b.

Hereinafter, the operation and effect of the disc brake having the above construction will be described.

If the driver steps on a brake pedal (not shown) while driving the vehicle, braking pressure generated in the master cylinder (not shown) is transferred to the caliper housing 40.

Due to the braking pressure, the piston 42 of the cylinder part 41 provided at one side of the caliper housing 40 pushes the inner pad plate 20b and the caliper housing 40 is moved back due to the braking pressure. Thus, the finger parts 43 provided at the other side of the caliper housing 40 push the outer pad plate 20a.

Therefore, the pads 21 of the pad plates 20a and 20b press the disc 10 so that the braking operation is performed due to the friction between the pads 21 and the disc 10.

At this time, the carrier 30 may be subject to the stress and deformation due to the torque generated by the rotation of the disc 10. The torsion pins 61 installed between the pad plates 20a and 20b can prevent the deformation of the carrier 30.

Figure 3:
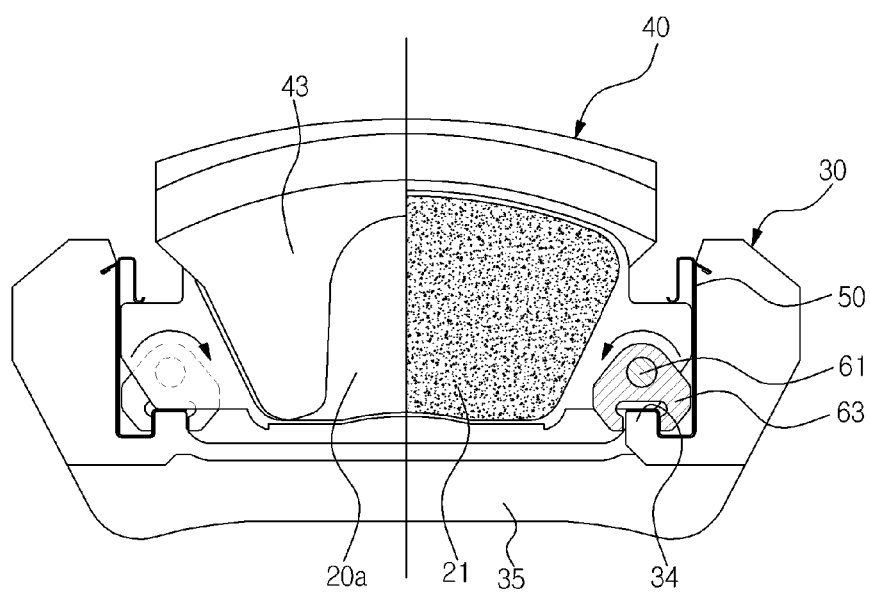
FIG. 3 is a sectional view for explaining the operation of a disc brake according to the disclosure.

According to the embodiment of the disclosure, as shown in FIG. 3, if the pad plates 20a and 20b push the carrier 30, one of the clip parts 63 provided at the left of the pad plates 20a and 20b may rotate in the right direction about the torsion pin 61 by the outer pad plate 20a and the other of the clip parts 63 provided at the right of the pad plates 20a and 20b may rotate in the left direction about the torsion pin 61 by the outer pad plate 20a.

Since the clip parts 63 are rotated about the torsion pins 61, the torsion pins 61 may be subject to the warpage deformation, so that strain energy of the carrier 30 can be absorbed through warpage deformation of the torsion pins 61 upon the braking operation, thereby diminishing the deformation of the carrier 30.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A disc brake comprising:
a disc rotating together with a wheel of a vehicle;
inner and outer pad plates each having an inner surface on which a pad is provided to press the disc;
a carrier in which the pad plates are installed such that the pad plates move back and forth in the carrier; and
a caliper housing in which a piston coupled to the carrier to press the inner pad plate against the disc is installed,
wherein clip parts are connected to the carrier at inner portions of both side ends of at least one of the pad plates and torsion pins are fitted into the clip parts such that the clip parts are rotated about the torsion pins relative to the carrier upon a braking operation of the disc brake, and wherein the outer pad plate is formed with insertion holes into which the torsion pins are inserted.

2. The disc brake of claim 1, further comprising protrusions provided at both side ends of the carrier, the both side ends of the carrier including tips from which the protrusions protrude, wherein each of the both side ends of the carrier protrude forward and extend inward in opposition to each other.

3. The disc brake of claim 2, wherein the protrusions engage with the clip parts.

4. The disc brake of claim 1, wherein the clip parts are arranged on the inner surface of the at least one of the pad plates.

* * * * *